United States Patent [19]
Bell et al.

[11] 4,291,466
[45] Sep. 29, 1981

[54] TRANSDUCER FOR MEASURING WORKPIECES

[75] Inventors: Seymour Bell, Southfield; Richard O. Juengel, Romeo, both of Mich.

[73] Assignee: The Valeron Corporation, Troy, Mich.

[21] Appl. No.: 75,573

[22] Filed: Sep. 14, 1979

[51] Int. Cl.³ .............................................. G01B 7/12
[52] U.S. Cl. .................................................. 33/148 H
[58] Field of Search ............ 33/143 L, 147 N, 148 H, 33/172 E, 147 L, 178 E, 174 L, 174 Q

[56] References Cited
U.S. PATENT DOCUMENTS

| | | | |
|---|---|---|---|
| 2,240,184 | 4/1941 | Hathaway | 33/172 E |
| 2,281,453 | 4/1942 | Petersen | 33/172 E |
| 2,309,891 | 2/1943 | Fisk | 33/148 R |
| 2,732,625 | 1/1956 | Buisson | 33/148 |
| 3,000,101 | 9/1961 | Giardino et al. | 33/143 L |
| 3,416,373 | 12/1968 | Havens | 73/339 |
| 3,922,792 | 12/1975 | Ito | 33/174 R |
| 3,943,632 | 3/1976 | Albertazzi | 33/174 L |
| 3,958,337 | 5/1976 | Anichini | 33/143 L |
| 3,962,792 | 6/1976 | Stepanek | 33/143 L |

OTHER PUBLICATIONS

Marposs Catalog, "Electronic Gauging Systems".
Marposs Catalog "In-Process Electronic Gauging Systems", Marposs Gauges Corp., Madison Heights, Mich.

*Primary Examiner*—Harry N. Haroian
*Attorney, Agent, or Firm*—Krass, Young & Schivley

[57] ABSTRACT

A caliper-type transducer for measuring a workpiece includes a pair of non-crossing pivot arms each having a contact end and a transducer end. The arms are interconnected for frictionless pivotal movement by a fixed pivot block and spring members which act to limit the displacement of the arms to complemental displacement in the plane of measurement. One arm carries two reactive elements mounted in spaced opposed relationship such that the transducer end of the other arm may be disposed therebetween to vary the reactances according to movement of the caliper ends which cause corresponding movement in their respective transducer ends. The change in reactances of the reactive elements are differentially sensed as the arms are displaced from an initial position when measuring the workpiece.

8 Claims, 5 Drawing Figures

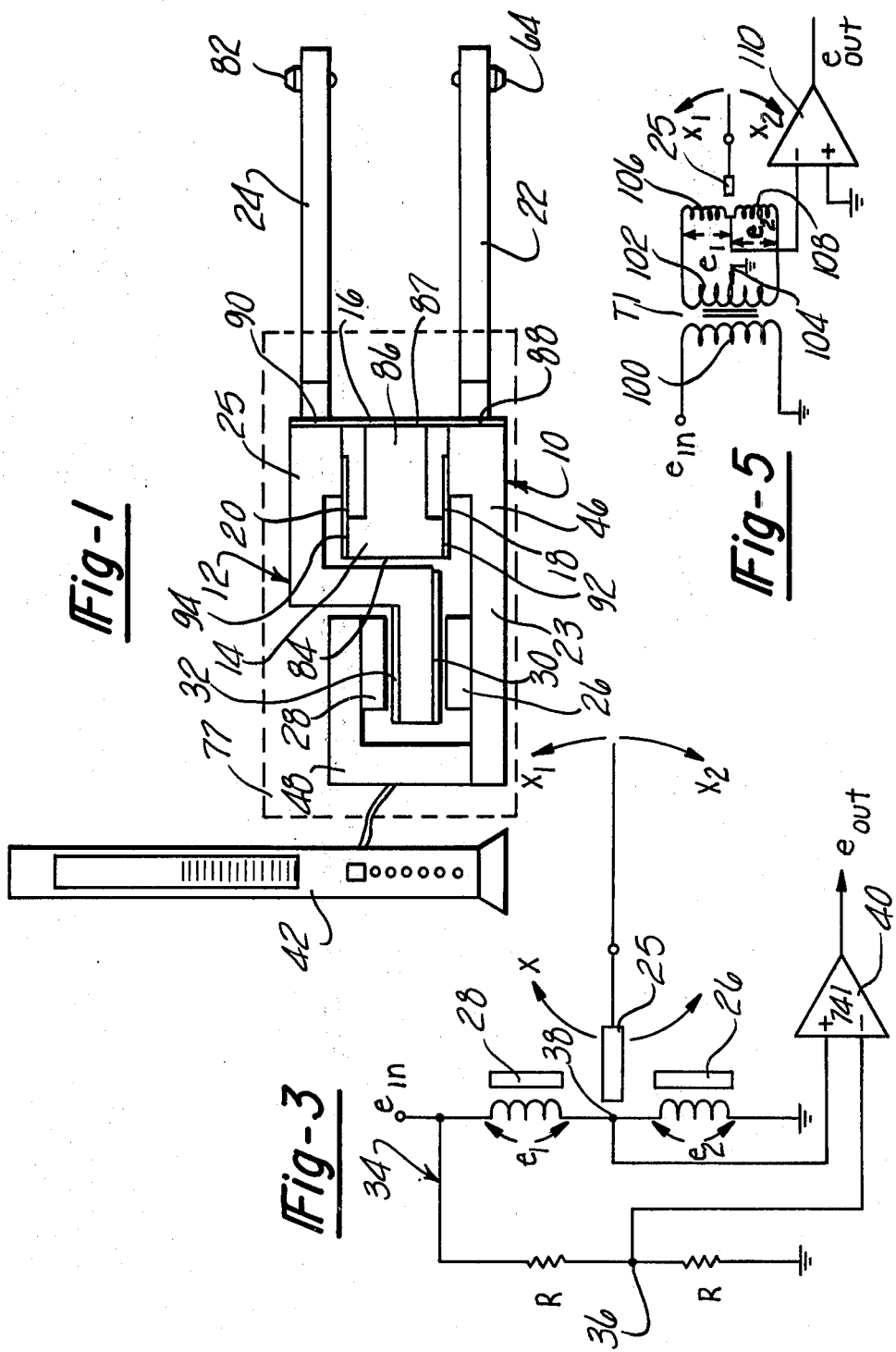

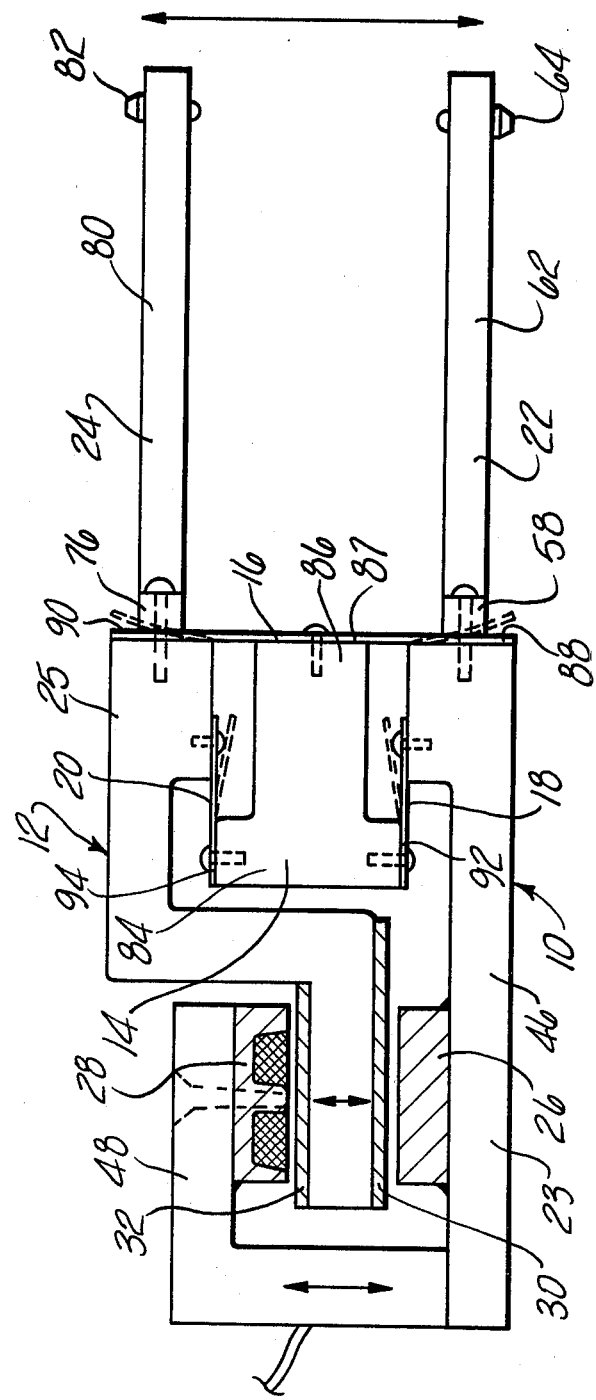

TRANSDUCER FOR MEASURING WORKPIECES

INTRODUCTION

This invention relates to an electromechanical measuring apparatus for gauging inside or outside dimensions of a workpiece, and more particularly to devices yielding an output linearly related to displacement.

BACKGROUND

There are many prior art devices which measure part dimensions as a function of the gap or distance between spaced elements which contact the part. The sensing elements of these devices include various electrical, magnetic and thermally actuated transducers.

Simple coil and core transducers are sometimes used in gauging fixtures; however, the output signal of these gauges is of an exponential form and must be modified electronically to be useable.

Linear variable displacement transducers (LVDT) are magnetically operative devices which generate a linear output signal relative to displacement. U.S. Pat. No. 2,196,806 to Hoadley discloses an early embodiment of an LVDT. However, due to their mode of operation, these devices are typically of such configuration that they do not readily lend themselves to gauging applications in which measurements must be accurately taken from workpieces having particular configurations, e.g., a cylindrical bore, which are not easily accessible by the LVDT's.

Thermally actuated transducers are able to provide a linear output but the range of measurement is limited.

Several different structural combinations exist for communicating the displacement of spaced elements when contacting a part to a transducing means. Some of these combinations include interlocking gears, scissor type pivot pins and various complicated combinations. However, they are generally subject to wear and environmental influences that affect accuracy and reliability. Finally, the prior art devices are typically designed for gauging either internal or external dimensions exclusively.

BRIEF SUMMARY OF THE INVENTION

In accordance with the present invention, a simple and rugged caliper type measuring device is provided which is capable of producing a highly linear electrical signal representing measured dimensions and which is readily adaptable to take measurements from workpieces having configurations not readily accessible to known LVDT's. In general, this is accomplished in a device having two rigid arms pivotably interconnected in non-crossing relationship mediate the ends thereof such that relative movement of the contact ends produces a proportional relative movement between the opposite ends. Said opposite ends are provided with signal generating means, such as variable reactive circuit elements, which produce an electrical signal quantity related to the measured dimensions.

In the preferred form, one of the arms is provided with a reverse-cursed or J-shaped end bearing opposed inductor coils. The corresponding end of the other arm includes a ferromagnetic pole piece which is disposed between such coils to vary the inductive reactances according to movement of the arms in the measurement plane. The outputs of the coils are differentially sensed by means of a simple bridge circuit and amplifier, wherein the resulting signal quantity is made both linear and of high signal-to-noise ratio. Moreover, since the coils and the pole piece move in unison with their respective arm portions which contact the workpiece, the initial setup and alignment of the device is not as critical in comparison to other gauges.

In accordance with another aspect of a preferred embodiment of the invention, the arms are reversible to allow the taking of both internal and external measurements and have portions which may be varied depending on the workpiece to be measured. To accomplish this, each arm is constructed in two portions, a transducer portion and a caliper portion. The caliper portion may have a wide variety of configurations to accomodate different workpieces and is reversibly alternately attachable to the transducer portion to change the orientation of its contact points to take internal and external measurements. The caliper ends may be attached to the device so as to preset the arms with a bias inward or outward to enable the device to take external or internal measurements in a wide variety of applications.

BRIEF DESCRIPTION OF THE DRAWINGS

FIG. 1 is a top plan view of the preferred embodiment of the invention;

FIG. 2 is a partially sectioned view of the embodiment of FIG. 1;

FIG. 3 is an electrical schematic circuit used in connection with the embodiment of FIG. 1;

FIG. 5 is an alternative electrical schematic circuit for use with the embodiment of FIG. 1.

DETAILED DESCRIPTION OF THE PREFERRED EMBODIMENT

Figure 4:
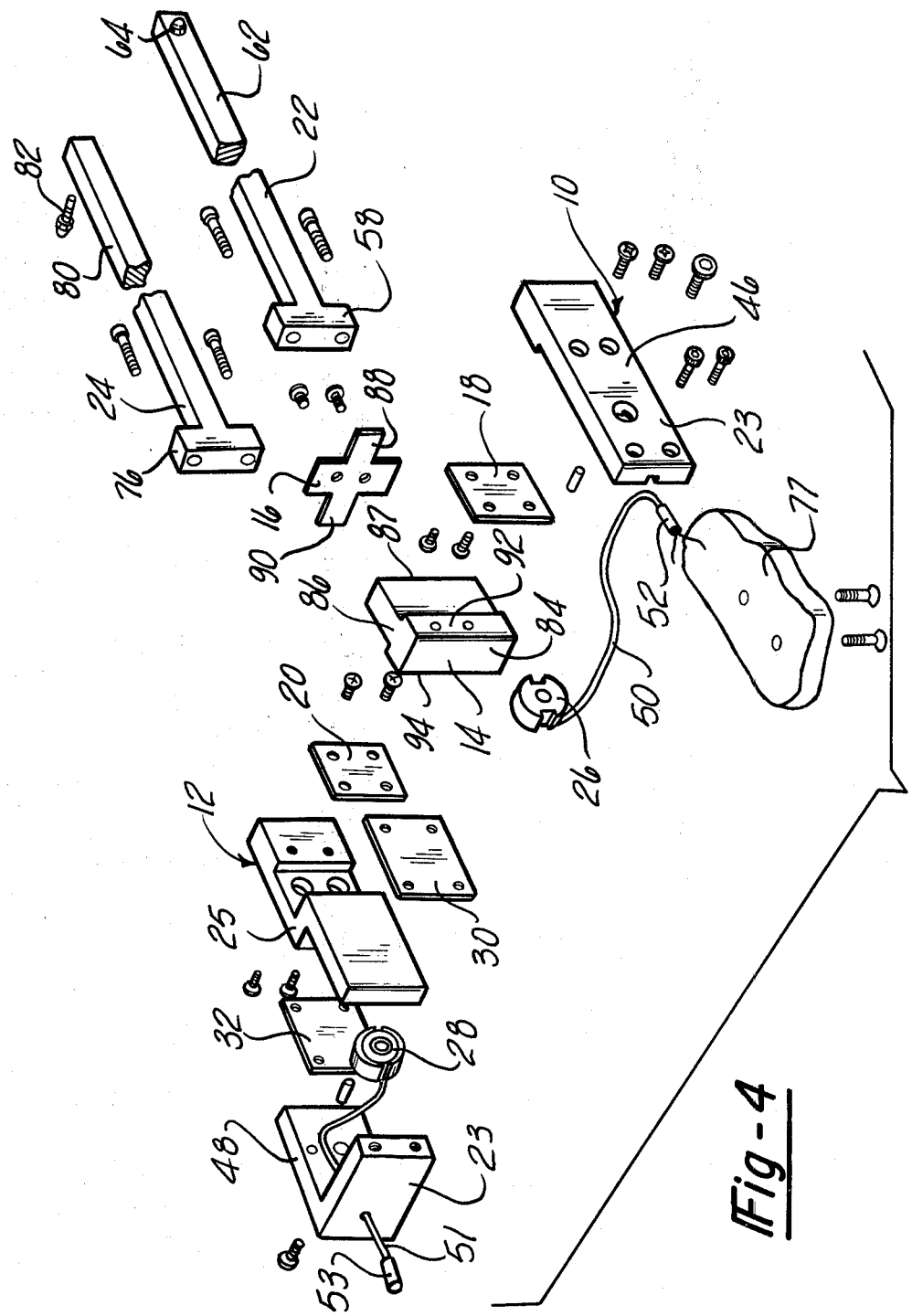
FIG. 4 is an exploded view of the embodiment shown in FIG. 1.

Referring now to FIGS. 1, 2 and 4, the preferred embodiment of the invention is shown to comprise a first arm 10, a second arm 12, and a pivot block 14 which interconnects the two arms in non-crossing relationship. Arm 10 is connected to pivot block 14 by transverse reed spring 16 and parallel reed spring 18. Arm 12 is connected to the pivot block 14 by transverse reed spring 16 and parallel reed spring 20. In FIGS. 1, 2 and 4 the thickness of the reed springs is enlarged for clarity. This combination of reed springs 16, 18, and 20 flexibly connect the arms 10 and 12 to the pivot block 14 thereby limiting the relative movement of the arms to complemental displacement toward and away from each other within the measurement plane.

Arm 10 comprises a caliper end 22 and a transducer end 23, the pivot block 14 being mediate the two ends. Similarly, arm 12 comprises caliper end 24 and transducer end 25, the pivot block 14 being mediate these two ends. The transducer end 23 of arm 10 is constructed in a J-shape to allow the mounting of inductors 26 and 28 in an opposed spaced relationship. Inductors 26 and 28 are preferably bobbinless coils mounted in ferrite pot cores. The transducer end 25 of arm 12 is S-shaped to allow the disposition of first and second ferromagnetic pieces 30 and 32 comprising a pole piece attached to one end thereof, between the inductors 26 and 28. In this arrangement the movement of the arms 10 and 12 produces an increase in the impedance of one inductor and a decrease in the impedance of the opposed inductor. As shown in FIG. 3 inductors 26 and 28 are electrically connected in opposite legs of bridge circuit 34. The change in voltage at bridge terminals 36 and 38 is sensed in the amplifier-comparator circuit 40 to yield an input for the display device 42, shown in FIG. 1.

The amplifier-comparator circuit 40 in the preferred embodiment may be a Type 741 operational amplifier or an equivalent. Transducing by inductive reactive elements, although advantageous, may be replaced with other elements whose electrical characteristics vary depending upon the relative displacement of an activator component. For example, the transducer end of the first arm could carry two complementally variable capacitors with the transducer end of the second arm carrying corresponding activator plate elements.

As shown in FIG. 4 transducer end 23 comprises a rectangular segment 46 for carrying inductor 26 and an L-shaped segment 48 for carrying inductor 28 in a spaced opposed relationship. Wires 50 and 51 leading from inductors 26 and 28 are sheathed in insulative tubing 52 and 53 or channeled in a wire feed through to prevent short circuiting through the arm.

The caliper end 22 is T-shaped in design as shown in FIG. 4 and the cross member 58 is mechanically attached, as shown in FIG. 2 by screws to the outer end of the rectangular segment 46. The rod portion 62 of the caliper end 22 extends from cross member 58. A standard carbide ball type contact point 64 is attached to a tapped hole in the side of caliper end 22 to engage a workpiece (not shown). The caliper end 22 is thus demountably attached to the transducer end, and may be attached with the contact point disposed for internal or external measurements.

First and second ferromagnetic pieces 30 and 32 are cemented to transducer end 25 on opposite surfaces between and facing the inductors 26 and 28. Thin plates of a high, magnetic permeability material known as $\mu$ metal are preferred. Alternatively, a ferrite slug may be imbedded in second arm transducer end 25 instead of the two ferromagnetic pieces shown in the preferred embodiment.

As shown in FIG. 4, caliper end 24 is T-shaped in design and cross-member 76 is mechanically attached, as shown in FIG. 2, to transducer end 25. The rod portion 80 of caliper end 24 extends from cross-member 76, with a standard form carbide ball type contact point 82 attached to a tapped hole in the side of the caliper end 24 that is to engage a workpiece (not shown). It should be noted that the two-part arm construction detailed herein is not the only format for implementing the invention. It is preferred, however, as it lends itself to a dual function gauge adaptable to making either internal or external measurements. The configuration of rod portions 62 and 80 of caliper ends 22 and 24, respectively, can be varied to accomodate different workpieces. Since the caliper ends 22 and 24 are detachable, these ends can be interchanged and yet still use the major portion of the device which operates in the same manner regardless of the configuration of the caliper ends. The mechanical symmetry inherent in the use of two arms of similar dimensions minimizes the effect of any elongation of the arms due to thermal expansion. Moreover, the utilization of two substantially identical inductors on the same mechanical base, complementally varied by a common activating element on transducer end 25 and connected in a bridge circuit to provide differential sensing serves to provide compensation for temperature changes, variations in line voltage and component aging.

As viewed in FIG. 1 pivot block 14 is substantially T-shaped with the cross-member of the T having a face 84 perpendicular to the longitudinal axes of the first and second arms 10 and 12. The rod portion 86 of the T parallel to the longitudinal axes of the arms. In the preferred embodiment the height of the pivot block 14 extends beyond the height of the first and second arms in one direction perpendicular to the measurement plane to permit the arms to move freely. The portion of the pivot block 14 extending beyond said arms has a mounting means comprising two tapped holes provided therein to secure the device to a base 77 shown in FIG. 4 and in dotted lines in FIG. 1. The device may be mounted in a wide range of orientations without affecting the measurement accuracy.

As shown in FIGS. 2 and 4 the transverse reed spring 16 is disposed perpendicular to said first and second arms and is compliant only to parallel movement of said arms, as shown in the dotted lines. The middle of transverse reed spring 16 is fastened to the end of the rod portion 87 of the pivot block 14. The first and second transverse reed spring ends 88 and 90 extend to the first and second arms 10 and 12. First transverse reed spring end 88 is clamped between caliper end 22 and transducer end 23. The two screws passing through cross-member 58 provide the clamping force but are spaced from spring end 88. Second transverse reed spring end 90 is similarly clamped between caliper end 24 and transducer end 25. As shown in FIG. 4 transverse reed spring 16 is rectangular in shape having each of its four corners notched to permit passage of fasteners from the respective caliper end 22 and 24 to transducer 23 and transducer end 25, respectively. The notches allow the arms to be attached to the transverse reed spring in a range of alignments.

As shown in FIG. 2 first and second parallel reed springs 18 and 20 are disposed parallel to the longitudinal axes of said first and second arms so as to be compliant only to divergent and convergent movement of the arms, as shown in the dotted lines. The first parallel reed spring 18 is fastened to the inner surface of the transducer end 23 of the first arm 10 and is connected to the pivot block cross-member end surface 92. The second parallel reed spring 20 is similarly fastened to the inner surface of transducer end 25 of the second arm 12 and is connected to the pivot block cross-member end surface 94. The springs 18 and 20 terminate slightly inboard of spring 16 to avoid binding when the arms are moved.

The resiliency of the reed springs determines the gauging tension of the device. The tension may be varied by changing the strength of the reed spring or changing the distance spanned by the parallel reed springs 18 and 20 between the pivot block and the respective arms or by varying the thickness of reed springs 18 and 20.

The frictionless reed spring pivot mechanism provides substantial advantages over the prior art in that it is insensitive to foreign material, requires no lubrication, is not subject to frictional wear, has desirable durability and can be inexpensively manufactured.

The device of the present invention is characterized in that it can be used for a wide variety of different gauging applications. As one example the caliper type transducer is set at an initial position corresponding to the dimensions of a master or part of ideal size. Due to the unique construction of this device, the initial position is set by clamping the caliper end portions 22 and 24 and the outer end portions of the transducer ends 23 and 25 to the transverse reed spring 16, which is biased in a particular direction, e.g. the reed springs are tensioned to close down for OD measurements and open up for ID measurements. Once clamped in this orientation the arms are placed under load at the desired dimension via use of the master part, and the associated electronics are zeroed. In machining operations for which this device finds particular utility it is usually only desirable to follow the progress of a machining operation as it approaches the desired dimension. After the desired dimension is obtained, there is no need to measure reduction beyond the desired dimension. For this reason the device of the preferred embodiment may be zeroed with the pole piece of the transducer end of the second arm 12 in close proximity to one inductor, and set in the initial position with the pole piece in close proximity to the other inductor. In this way the full range of measurement of the device may be realized. For example, in an operation to reduce an outside dimension from 35 mm to 30 mm the arms would be clamped in position at 35 mm and the gauge would be zeroed at the desired dimension of 30 mm using a master part. To maximize this range of measurement the pole piece of second arm transducer 25 can be placed in close proximity to inductor 26 when clamped in the initial position and in close proximity to inductor 28 when zeroed at the desired dimension. If the device is zeroed with the pole piece of transducer end 25 substantially centered between inductors 26 and 28, bidirectional deviations may be measured. Since the pole piece and inductors 26, 28 are freely movable and mutually react with complemental displacement of their respective arms, the workpiece may be misaligned with the device to some degree without deleteriously affecting the accuracy of the measurement. Still other applications of this device will become readily apparent to one skilled in the art.

Regardless of the application, as the contact points 64 and 82 engage the workpiece they are displaced from an initial position if the measured part varies in dimension from the master part, which displacement is transferred the length of the rigid arms 10 and 12 through the pivotal motion of the arms around pivot block 14. The movement of contact points 64 and 82 is reflected in the complemental displacement of the transducer ends 23 and 25 causing a change in the impedance of each inductor, due to the change in spacing between the pole piece and the inductors. The inductors are electrically connected in bridge circuit 34 wherein the resulting change in impedance causes a change in voltage at bridge terminals 36 and 38. The output of the inductors are differentially sensed in amplifier-comparator circuit 40 to yield an output that is displayed on the display device 42. The display device may be of the electronic column gauge type disclosed in U.S. Pat. No. 4,038,756, or any other suitable type. This type of gauge has nulling circuit suitable for setting the caliper type transducer. As noted above, the output of the device is extremely linear and is not affected by changes in line voltage, temperature fluctuations, and component aging due to the differential sensing technique.

FIG. 5 shows a preferred electrical circuit which may be used in place of the circuitry of FIG. 3. This circuit utilizes a transformer T1 having a primary winding 100 and a secondary winding 102. The secondary winding is center tapped as represented by 104 such that each half of the secondary winding serves as one leg of the inductive bridge network. Coils 106 and 108 of the transducer complete the bridge circuit. This circuit permits the use of a relatively inexpensive single-ended amplifier 110 to differentially sense the output of the transducer as activator element 25 is moved relative to the coils 106 and 108 since both the center tap 104 and the noninverting input of the amplifier 110 are grounded. Since the probe excitation voltage source, $e_{in}$, is isolated via transformer T1 from the sensing circuitry, noise is minimized and greater flexibility in designing the grounding systems for the circuitry is obtained.

It is to be understood that the invention has been described with reference to a specific illustrative embodiment, that various modifications are possible, and that the foregoing description is not to be construed in a limiting sense.

The embodiments of the invention in which an exclusive property or privilege is claimed are defined as follows:

1. A caliper-type transducer for measuring dimensions of a workpiece comprising:
   first and second rigid arms, each having a caliper end and a transducer end;
   pivot means comprising a pivot block and spring means connected to said pivot block for frictionlessly interconnecting said first and second arms mediate their ends to limit the relative movement of said arms to complemental displacement toward and away from each other within a measurement plane;
   said spring means further including at least one transverse spring means interconnecting said arms to a portion of the pivot block, said transverse spring means being compliant only to movement of said arms within the measurement plane in the direction parallel to the arms; and at least one parallel spring means interconnecting said arms to another portion of the pivot block wherein said parallel spring means is compliant only to movement of said arms within the measurement plane in the direction perpendicular to the arms;
   the transducer end of the first arm carrying first and second opposing transducing elements spaced apart in said measurement plane;
   the transducer end of the second arm being disposed mediate the transducing elements to complementally vary an electrical characteristic thereof with displacement therebetween; and
   sensing means electrically connected to the transducing elements for producing a signal related to the differential change in electrical characteristics of said elements caused by displacement of said arms.

2. The caliper-type transducer as described in claim 1 wherein said transverse spring means is a generally rectangular reed spring substantially centrally fastened to the pivot block thereby providing means for presetting said arms in an initial position by clamping said arms onto each end of said transverse spring means respectively in a variably spaced relationship from said pivot block.

3. The caliper-type transducer as described in claim 1 wherein said parallel spring means comprises first and second parallel reed springs fastened on one end to opposite sides of the pivot block, said sides being parallel to the arms, said parallel reed springs extending to the first and second arms and fastened to said arms respectively in a spaced relationship from said pivot block.

4. The caliper-type transducer as described in claim 1 wherein the pivot block extends in one direction perpendicular to the measurement plane beyond the arms to provide a means for mounting said device, whereby both of said arms are freely moveable.

5. A caliper-type transducer for measuring dimensions of a workpiece comprising:
   first and second rigid arms, each having a caliper end and a transducer end;
   pivot means for frictionlessly interconnecting the two arms intermediate their ends, each of said arms being moveable toward and away from one another in a measurement plane about said pivot means;
   the transducer end of the first arm carrying first and second substantially identical inductor coils mounted opposingly in spaced relationship within the measurement plane on the transducer end of the first arm;
   the transducer end of the second arm being disposed mediate the inductor coils and having an activator means including first and second ferromagnetic pieces mounted thereon for varying the impedances of said first and second inductor coils inversely to each other according to the relative motion of the arms as said ferromagnetic pieces move therebetween; and
   sensing means electrically connected to the inductor coils for producing a signal related to the differential change in electrical characteristics of said inductor coils caused by displacement of said arms.

6. A caliper-type transducer for measuring dimensions of a workpiece comprising:
   first and second rigid arms, each having a caliper end and a transducer end;
   pivot means for frictionlessly interconnecting the two arms mediate their ends, each of said arms being moveable toward and away from one another in a measurement plane about said pivot means;
   the transducer end of the first arm carrying first and second substantially identical inductor coils electrically connected in opposite legs of a bridge circuit and mounted opposingly in spaced relationship within the measurement plane on the transducer end of the first arm;
   the transducer end of the second arm being disposed mediate the inductor coils and having an activator means mounted thereon for varying the impedances of said first and second inductor coils according to the relative motion of the arms; and
   comparison means electrically connected to the bridge circuit for differentially comparing the change in impedance of said inductors and providing an output signal proportional to the difference of the impedance of said inductors.

7. The transducer type caliper as described in claim 6 wherein the output signal from the comparison means is coupled to a display device for providing a visual indication of the size of the workpiece being measured.

8. A caliper-type transducer for measuring dimensions of a workpiece comprising:
   first and second rigid arms, each having a caliper end and a transducer end;
   pivot means for frictionlessly interconnecting the two arms mediate their ends, each of said arms being moveable toward and away from one another in a measurement plane about said pivot means;
   the transducer end of the first arm carrying first and second substantially identical inductor coils mounted opposingly in spaced relationship within the measurement plane on the transducer end of the first arm, said first and second inductor coils being electrically connected in opposite legs of a bridge circuit;
   the transducer end of the second arm being disposed mediate the inductor coils and having an activator means mounted thereon for varying the impedances of said first and second inductor coils according to the relative motion of the arms; and
   sensing means including a transformer having primary and secondary windings, said secondary winding being centrally tapped and grounded so that the portions of the secondary winding provide separate legs of the bridge network, a voltage source coupled to the primary winding of the transformer, and a single ended amplifier means coupled to the output of the bridge network for providing an output signal which is a function of the displacement of the activator means relative to the coils.

* * * * *